United States Patent [19]

Keuning et al.

[11] 4,360,536
[45] Nov. 23, 1982

[54] PROCESS FOR THE DRY FRACTIONATION OF OILS AND FATS HAVING A STEEP DILATATION/TEMPERATURE LINE AND USE OF THE FRACTIONATED FATS IN MARGARINES AND SHORTENINGS

[75] Inventors: Roelof Keuning; Adolf J. Haighton; Willem Dijkshoorn, all of Vlaardingen; Hindrik Huizinga, Maassluis, all of Netherlands

[73] Assignee: Lever Brothers Company, New York, N.Y.

[21] Appl. No.: 266,697

[22] Filed: May 26, 1981

[30] Foreign Application Priority Data

May 30, 1980 [NL] Netherlands ............... 8003142

[51] Int. Cl.$^3$ .................. A23D 3/02; A23D 5/00; A23D 5/02
[52] U.S. Cl. .................. 426/603; 426/606; 426/607; 260/428
[58] Field of Search ............... 426/606, 607, 601, 603; 260/428

[56] References Cited

U.S. PATENT DOCUMENTS

| Re. 30,086 | 8/1979 | Carlile et al. | 426/607 X |
|---|---|---|---|
| 782,820 | 2/1905 | Bloom | 426/607 X |
| 1,058,738 | 4/1913 | Ellis | 426/607 |
| 1,206,954 | 12/1916 | Walker | 426/607 X |
| 1,372,615 | 3/1921 | Ellis | 426/607 |
| 4,161,484 | 7/1979 | Van den Berg | 260/428.5 |
| 4,205,095 | 5/1980 | Pike et al. | 426/607 |

FOREIGN PATENT DOCUMENTS 7700106  1/1977  Netherlands .

OTHER PUBLICATIONS

A. J. Haighton, J.A.O.C.S., 36, (1959), pp. 345–348.
Fette Seifen, 80, (1978), 180–186.

*Primary Examiner*—Robert A. Yoncoskie
*Attorney, Agent, or Firm*—James J. Farrell

[57] ABSTRACT

The dry fractionation of oils and fats having a steep dilatation curve (A), i.e. exhibiting a difference in dilatation value at 15° C. and 25° C. of at least 800 mm$^3$/25 grammes, in practice is difficult. This problem is solved by mixing oils and fats (A) with triglycerides (B) of such nature that the difference in dilatation of the mixture obtained diminishes substantially. The triglycerides (B) have a difference in dilatation values at 15° C. and 25° C. not exceeding 600 mm$^3$/25 g. The weight ratio between fats (A) and fats (B) varies between (10–90):(90–10), preferably (20–80):(80–20) and ideally (40–60):(60–40). The process is e.g. particularly attractive for the dry fractionation of palmkernel oil (fat A) in the presence of palm oil (fat B).

10 Claims, No Drawings

PROCESS FOR THE DRY FRACTIONATION OF OILS AND FATS HAVING A STEEP DILATATION/TEMPERATURE LINE AND USE OF THE FRACTIONATED FATS IN MARGARINES AND SHORTENINGS

The present invention relates to a process for the dry fractionation of oils and fats which at least of their dilatation/temperature curve have a steep course. A steep dilatation line means that over a short temperature range the fat concerned displays a great difference in the amount of crystallized triglycerides. Consequently, if it is wished to fractionate such fats in order to prepare fractions having precisely specified properties, extremely accurate control of the temperature at which the fractionation takes place is necessary. A fractionation temperature that is a little too high will result in a considerably lower yield of stearin being obtained; a fractionation temperature a little too low can be of very substantial influence upon the composition of the stearin fraction then obtained in too great an amount. The fractionation of fats having a steep dilatation/temperature curve is especially a problem with industrial processes which take place on a large scale.

Problems are particularly pronounced when fats have to be fractionated having a difference in dilatation value at 15° and 25° C. of at least 800 mm$^3$/25 grammes.

Difficulties are especially encountered when fats derived from fatty acids having a relatively short chain, i.e. a chain containing 12-14 carbon atoms, such as coconut oil, palmkernel oil and babassu oil, are subjected to dry fractionation. Separation of the stearin fraction from the olein fraction by filtration is almost impossible and complicated press techniques have to be applied to achieve an efficient separation of said fractions.

According to the present invention, such fats, before they are fractionated, are mixed with triglycerides of a nature such that in the temperature range in which it is wished to carry out the fractionation the difference in dilatation values of the mixture diminishes substantially. Consequently, in the temperature range mentioned the added triglycerides will have to have an amount of solid phase such that they can exert a substantial influence upon the steepness of the dilatation line of the mixture. Preferably triglycerides are added of a nature such that during the fractionation the added triglycerides crystallize out earlier and thus form nuclei on which the triglycerides of the fats having the steep dilatation curve can crystallize, because it is so that the fats having a steep dilatation curve generally crystallize in the form of very fine crystals which barely grow even when remaining a very long time under the crystallization conditions applied. The triglycerides to be added to the "steep fats" before the fractionation have a difference in dilatation values at 15° and 25° C. not exceeding 600 mm$^3$/25 grammes.

These triglycerides may consist of palm oil, lard, tallow and also hydrogenated and/or fractionated derivatives thereof.

The weight ratio between the fats of the first and the second kind can vary between (10-90):(90-10), preferably between (20-80):(80-20) and ideally between (40:60) and (60:40).

For the fractionation of palmkernel oil it has appeared to be particularly attractive to carry out the process in the presence of palm oil. A mixture of for example 20-80 parts by weight of palm oil and 80-20 parts by weight of palmkernel oil yields a stearin fraction that is eminently suitable for the preparation of margarines, low calorie margarines, bakery fats and cooking fats.

The fat mixture that can be used for such products can consist of oils and fats having a lower melting point than the stearin fraction obtained by co-fractionating the steep fat and said added triglycerides, as well as of other fractions of oils and fats. The weight ratio between on one hand the stearin fraction obtained by co-fractionation and, on the other hand, the oil having a lower melting point can vary, depending on the desired manner of packaging (normally, margarines packaged in beakers are softer than those packaged in wrappers) and also is dependent on the weight ratio between fats which have been fractionated together and also the temperature at which the fractionation took place. The co-fractionation can be carried out under the conditions usual for dry fractionation, which will be illustrated in the Examples, at temperatures ranging from 18°-30° C. and preferably from 20°-28° C.

It is known from Japan Kokai No. 77117307 to subject a mixture of fats consisting of shea fat and palm oil to wet co-fractionation involving the use of a specific alcohol as a solvent.

The process described in said Japanese publication provides an improvement of a solvent fractional crystallization using an aliphatic, monohydric alcohol as the solvent, whereas the process of the present invention provides a different solution, i.e. the addition of specific triglycerides to steep fats which have to be fractionated, using a different technique, i.e. dry fractionation. In wet fractionation the efficiency of the separation of the fractions obtained is high due to the diluting effect of the solvent on the occluded olein. Moreover, the stearin is usually washed with cold solvent. Consequently, when a wet fractionation is considered, it is not required to apply co-fractionation, since such technique does not provide any substantial benefit.

By making use of stearins which have been obtained by co-fractionation according to the present invention, margarine fats can be prepared containing neither hydrogenated nor interesterified oils and fats. Preferably the stearin fractions obtained according to the present invention are used in amounts varying from 5 to 50% of the fat mixture, along with 95-50% of an oil that is liquid at room temperature or a mixture of oils liquid at room temperature with one or more higher melting fats.

The liquid oil used is therefore preferably an oil or oil mixture rich in linoleic acid radicals, such as sunflower oil, safflower oil, corn oil, wheat germ oil, etc.

Fat mixtures thus prepared are pre-eminently suitable for incorporation in products which are filled into beakers in pourable form. With such fat mixtures health margarines for example can be prepared which have at 10° C. a hardness of not more than 400 to 500 g/cm$^2$ and at 20° C. a hardness of at least 50 g/cm$^2$ (after 3 weeks).

The oleins obtained according to the process of the invention can likewise be used in margarines, low calorie margarines, bakery fats and cooking fats; preferably such oleins are used in hydrogenated form. For the preparation of products which are filled into beakers in pourable form, for example, a fat mixture can be used consisting of 5-20% by weight of completely or almost completely hydrogenated oleins along with 95-80% by weight of an oil liquid at room temperature, for example sunflower oil.

For products which can be packaged in wrappers, partially hydrogenated oleins are used by preference, along with a fat mixture such that the product is obtained with a hardness of 900–2600 g/cm$^2$ at 10° C. and of 100–500 g/cm$^2$ at 20° C.

One of the ways in which the partially hydrogenated oleins can be obtained is by hydrogenation in the presence of a sulphurated nickel catalyst under the usual conditions until oleins having a trans-fatty acid content of 5 to 15% by weight have been formed. For the last-mentioned products 10–50% by weight of partially hydrogenated oleins can be used, preferably along with oils liquid at room temperature, fats having a melting point of 25°–39° C. and fats having a melting point of 40°–48° C. The weight ratios and kind of various fats to be used will be determined by the desired properties of the final product, the availability and cost price of the raw materials and also workability and taste thereof.

The invention will now be explained with the help of the following Examples.

EXAMPLES I–IV

Mixtures of palm oil and palmkernel oil were dry-fractionated, i.e. from the melt that is to say without solvent or an aqueous solution containing a surface-active agent.

To that end the mixtures were stabilized for a number of hours as given in Table A at a temperature of 23°–28° C. and subsequently the oleins were separated from the stearins.

The process was carried out either according to the process described in Dutch patent application No. 7700106 (here described as agglomeration) or with the aid of a conical kettle.

The agglomeration was carried out as follows:

The fat mixture was dosed at a temperature of 23°–28° C. into a cylindrical vessel provided with a cylindrical, axially placed rotor and a saucer-shaped base plate; the cylinder was kept at the stabilization temperature by means of a cooling jacket with a suitable cooling medium. The rotor extended by full length of the vessel, was centrally fixed in the base plate and the cover plate and was rotated by means of an electromotor at a speed of 150 rev. per minute. The inside diameter of the cylindrical vessel was 75 mm (volume 210 cm$^3$); the outside diameter of the rotor was 37.5 mm.

In the conical kettle the process was carried out as follows:

The fat mixture was dosed at a temperature of 23°–25° C. into a cylindrical vessel provided with a bottom in the shape of an inverted cone having an angle of 90°. The vessel was provided with a gate stirrer extending the full length of the vessel; stirring was done at a speed of 8 rev. per minute.

The diameter of the cylindrical part of the conical kettle was 120 mm (volume 1000 cm$^3$). After agglomeration or working in the conical kettle the oleins were separated from stearins by filtration.

The results were as follows:

TABLE A

| Example N° | I | II | III | IV |
|---|---|---|---|---|
| Fat mixture | | weight ratio % | | |
| Palmkernel oil | 20 | 30 | 40 | 60 |
| Palm oil | 80 | 70 | 60 | 40 |
| Method | Agglomeration | Conical kettle | Agglomeration | Conical kettle |
| Stablilization time hours | 4 | 3 | 2 | 5 |

TABLE A-continued

| Example N° | I | II | III | IV |
|---|---|---|---|---|
| Stabilization temperature °C. | 28 | 25 | 23 | 23 |
| Yield stearin: | 16% | 16% | 18% | 19% |
| N values* of the stearin at 10° C. | 74.5 | 75.4 | 74.6 | 76.1 |
| at 20° C. | 55.7 | 54.6 | 47.7 | 50.1 |
| at 30° C. | 36.9 | 30.5 | 25.4 | 19.5 |
| at 40° C. | 22.1 | 18.0 | 9.7 | 9.2 |
| at 50° C. | 8.6 | 1.0 | — | — |

*measured as described in "Fette, Seifen, Anstrichmittel" 80, 180–186 (1978)

In all cases no nucleation problem was encountered. The stearin fraction could easily be separated from the olein fraction by filtration.

Effective co-fractionation was established by analysing the fractions for properties like iodine values, solid contents, fatty acid and triglyceride compositions to ascertain that the proportions of the fat components of the fat blend subjected to co-fractionation were reflected in the isolated solid phases. For example, the fatty acid composition of the stearin fraction obtained by fractionating a mixture of 40% of palm oil (PO) and 60% of palmkernel oil (PK) was analysed by gas-chromatography and compared with a 40/60 mixture of stearins obtained by fractionating separately palm oil and palmkernel oil.

The results were as follows:

| Fatty acid composition of the stearin fraction obtained by co-fractionation of a mixture of 40 PO/60 PK | | Calculated fatty acid composition of a mixture of 40 PO/60 PK | |
|---|---|---|---|
| C$_8$ | 1.7 | C$_8$ | 1.2 |
| C$_{10}$ | 1.9 | C$_{10}$ | 1.7 |
| C$_{12}$ | 32.2 | C$_{12}$ | 32.8 |
| C$_{14}$ | 11.8 | C$_{14}$ | 13.5 |
| C$_{16}$ | 28.4 | C$_{16}$ | 25.0 |
| C$_{18}$ (saturated) | 4.8 | C$_{18}$ (saturated) | 3.1 |
| C$_{18}$ (mono-unsaturated) | 15.9 | C$_{18}$ (mono-unsaturated) | 18.4 |
| C$_{18}$ (di-unsaturated) | 3.3 | C$_{18}$ (di-unsaturated) | 4.2 |

From the above data it is clear that a substantial amount of PK crystallizes along with PO in a proportion which is comparable to the PO/PK proportion in the blend before co-fractionation.

EXAMPLES V and VI

The oleins from Examples III and IV were hydrogenated in the usual manner with a nickel-on-kieselguhr catalyst to complete saturation. The hard fat obtained from the olein of Example III had a melting point of 55° C.; the hard fat from the olein of Example IV had a melting point of 52° C.

Margarine fats were prepared from both hard fats by mixing 12.9% of hard fat with 87.1% of sunflower oil.

83.2% by weight of margarine fat was mixed with 0.1% by weight of monoglycerides of completely hydrogenated palm oil, 0.18% by weight of phosphatide and 0.1% by weight of β-carotene. An aqueous phase was prepared by mixing 15.82% by weight of water with 0.6% by weight of skimmilk solids. Margarine was prepared by making a pre-emulsion of margarine fat and aqueous phase and pumping it into a votator A-unit at a temperature of 39° C., where cooling to 7° C. took place; subsequently cooling to 5° C. was effected in a second votator A-unit, and in an uncooled crystallization vessel provided with a stirrer crystallization took place with the temperature rising to 13° C., at which temperature the emulsion obtained was filled into containers in which the product further stiffened to spreadable consistency.

The properties of the margarines are given in Table B.

TABLE B

| Example N° | V | VI |
|---|---|---|
| Fat mixture | weight ratio % | |
| Sunflower oil % by weight | 87.1 | 87.1 |
| Hydrogenated olein, Example IV | 12.9 | |
| Hydrogenated olein, Example III | | 12.9 |
| N values at 5° C. | 14.2 | 15.1 |
| 10° C. | 11.3 | 12.0 |
| 15° C. | 6.1 | 8.0 |
| 20° C. | 2.7 | 4.0 |
| 25° C. | 0.6 | 2.0 |
| Hardness g/cm², after 1 week/after 3 weeks | | |
| at 5° C. | 205/235 | 215/235 |
| at 10° C. | 140/165 | 150/165 |
| at 15° C. | 115/115 | 125/130 |
| at 20° C. | 90/95 | 100/110 |

EXAMPLES VII, VIII and IX

Three margarines for packaging in wrappers were prepared from a margarine fat and an aqueous phase which contained, calculated on the final product, 0.2% of skimmilk powder, 0.3% of whey powder and 1% of salt.

point indicated. The trans-fatty acid content of the olein was then 9%.

The hydrogenated olein used in Example IX was in addition randomly interesterified.

The results are shown in Table C.

TABLE C

| Example VII | VIII | IX |
|---|---|---|
| 25% soya oil | 17% rapeseed oil | 75% fish oil hydrogenated to 35° C. |
| 21% soya oil hydrogenated to 28° C. | 15% olein hydrogenated to 31° C. | 25% inter-esterified olein hydrogenated to 31° C. |
| 17% olein hydrogenated to 31° C. | 53% fish oil hydrogenated to 35° C. | |
| 30% fish oil hydrogenated to 31° C. | 15% soya oil hydrogenated to 28° C. | |
| 7% fish oil hydrogenated to 41° C. | | |
| Hardness in g/cm² after 1 week at | | |
| 5° C. 1250 | 1550 | 2500 |
| 10° C. 1000 | 1250 | 1450 |
| 15° C. 380 | 400 | 495 |
| 20° C. 175 | 260 | 156 |

EXAMPLES X-XIV

Margarines were likewise prepared from the stearin obtained in Example IV.

Except that the compositions of the fat mixtures were altered, the margarines were prepared in the same manner as described in Examples V and VI.

Table D shows the compositions and the properties.

| | Example N° | | | | |
|---|---|---|---|---|---|
| Fat mixture | X | XI | XII | XIII | XIV |
| Sunflower oil | 70% | 70% | 65% | | 65% |
| Soya oil | | | | 65% | |
| Palmkernel oil | 5% | | | | |
| Coconut oil | | | | 10% | |
| Dry-fractioned palm oil stearin (melting point 48° C.) | | | | | 10% |
| Stearin from Example IV | 25% | 30% | 35% | 25% | 25% |
| Solid phase % (NMR) | | | | | |
| at 10° C. | 16.0 | 16.7 | 19.2 | 17.4 | 17.4 |
| at 20° C. | 6.4 | 6.4 | 6.1 | 4.3 | 7.3 |
| at 30° C. | 3.3 | 2.4 | 3.1 | 2.0 | 4.1 |
| at 35° C. | 2.2 | 2.0 | 1.8 | 1.3 | 2.8 |
| Hardness | | | | | |
| at 10° C. (1 week/3 weeks) | 410/430 | 350/380 | 420/460A | 325/350 | 400/410 |
| at 15° C. | | 210 | | | |
| at 20° C. | 75/90 | 90/100 | 70/75 | 45/55 | 60/65 |

The process was carried out as described in Examples V and VI, except that the crystallizer was placed between a first and second A-unit, that the last A-unit was followed by an uncooled and unstirred B-unit and that other fat mixtures were used and the temperatures were as follows:

In-feed first A-unit 41° C.
In-feed crystallizer 19° C.
In-feed second A-unit 23° C.
In-feed B-unit 12° C.
Packaging at 15° C.

This time the margarine was not filled into packages in liquid form, but a brick-shaped piece of margarine was extruded and packaged in wrappers.

Each of the three fat mixtures contained an olein from Example III, hydrogenated to 31° C. This olein was hydrogenated at a temperature of 180° C. with a sulphurated nickel-on-kieselguhr catalyst to the melting The hardness of the margarines was measured by the method developed by Haighton, as described in J.A.O.C.S. 36 (1959), pages 345-348.

We claim:

1. A process for the fractionation of oils and fats which have a difference in dilatation values at 15° C. and 25° C. of at least 800 m³/25 g, comprising:
    (i) mixing said oils and fats with triglycerides prior to fractionation; said triglycerides having a higher slip melting point than said oils and fats and said triglycerides having a difference in dilatation values at 15° C. and 25° C. of not more than 600 m³/25 g;
    (ii) subjecting the mixture thus obtained to dry-fractionation for a time and temperature effective to obtain a stearin fraction and an olein fraction.

2. A process according to claim 1, wherein said oils and fats are selected from the group consisting of coconut oil, palm-kernel oil and babassu oil.

3. A process according to claim 1, wherein said triglycerides are selected from the group consisting of palm oil, lard, tallow, hydrogenated palm oil, hydrogenated lard, hydrogenated tallow and fractions thereof.

4. A process according to claim 1, in which dry-fractionation is carried out at a temperature ranging from 18° to 35° C.

5. A process according to claim 4, in which dry-fractionation is carried out at a temperature ranging from 20° to 28° C.

6. A process according to claim 1, in which the mixture which is dry-fractionated has a weight ratio of fats and oils to triglycerides of 20-80 to 80-20.

7. A process according to claim 1, in which said fats and oils consist of palmkernel oil and said triglycerides consist of palm oil.

8. A process for producing a fat blend which is useful for the preparation of margarines, comprising mixing 5-50% by weight of a stearin produced according to claim 1 and 95-50% by weight of an oil that is liquid at room temperature.

9. A process for producing a fat blend which is useful for the preparation of margarines which are filled in pourable form into beakers, comprising mixing 5 to 20 weight percent of a completely or substantially hydrogenated olein obtained according to claim 1, along with 95 to 80% by weight of an oil which is liquid at room temperature.

10. A process for producing margarines and low-calorie margarine-like spreads comprising emulsifying a fat phase containing as one of the fat components a stearin or an olein fraction obtained according to claim 1, with an aqueous phase.

* * * * *